Patented Mar. 28, 1950

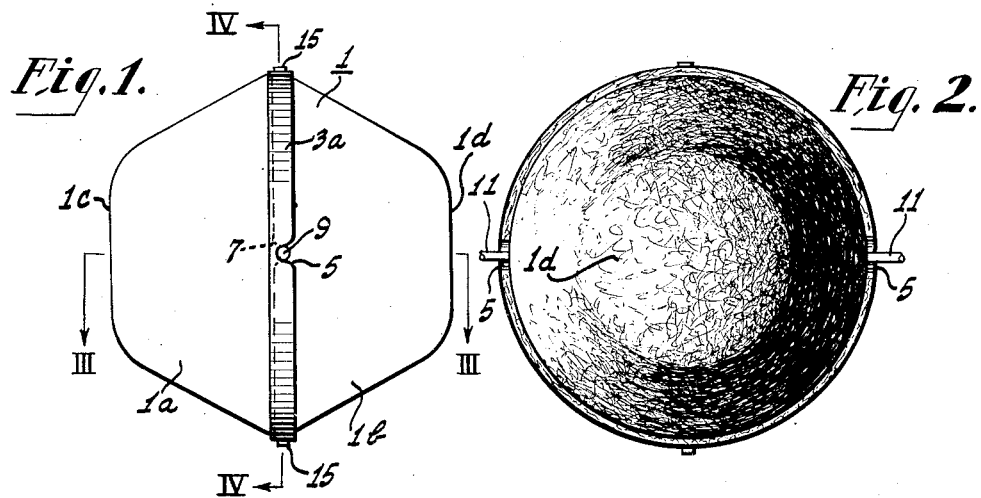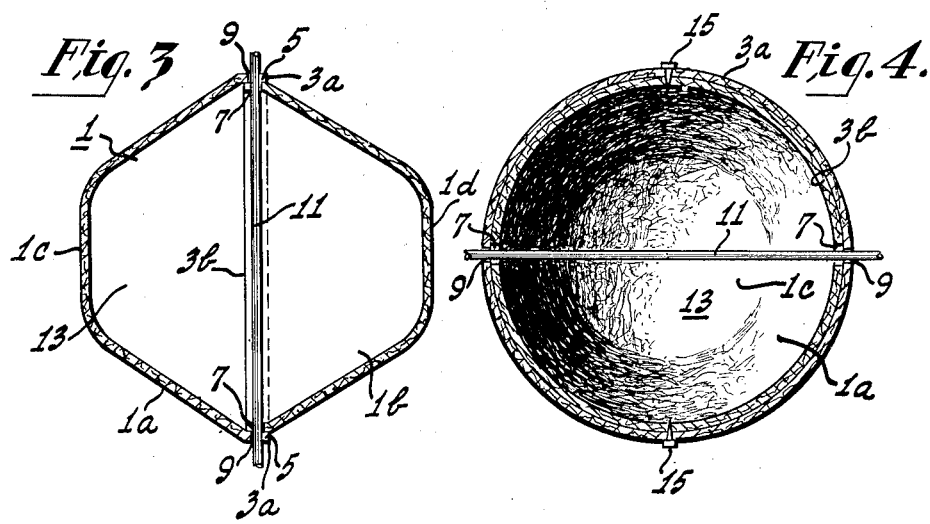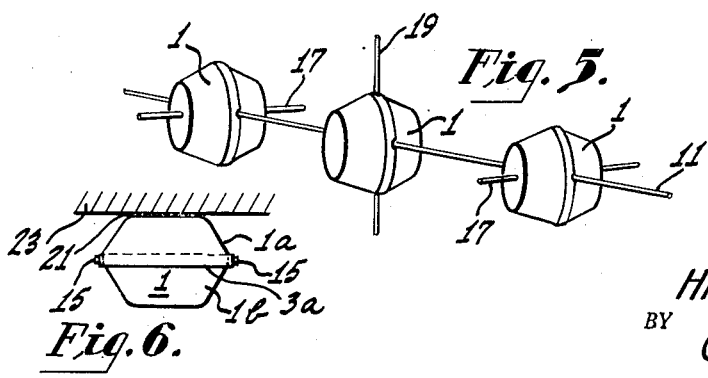

2,502,019

UNITED STATES PATENT OFFICE 2,502,019

DIFFRACTION TYPE SOUND ABSORBER WITH COMPLEMENTARY FITTING PORTIONS

Harry F. Olson, Princeton, N. J., assignor to Radio Corporation of America, a corporation of Delaware Application January 26, 1945, Serial No. 574,771

6 Claims. (Cl. 181—33)

This invention relates to acoustic absorbers, and more particularly to an acoustic absorber of the diffraction type, the present invention being an improvement over the type of absorber disclosed and claimed in my copending application, Serial No. 512,320, filed November 30, 1943.

In my aforesaid copending application Serial No. 512,320, there is disclosed a diffraction type acoustic absorber comprised of a casing which encloses a relatively large volume of air and the wall structure of which is constituted by a material which is pervious to sound waves but which offers a high dissipative impedance thereto. By making the wall structure of such a material and making the cavity or space within the casing so large that the volume of air therein offers a very small impedance to the sound waves, a very highly efficient functional sound absorber is provided.

According to the disclosure of my aforesaid copending application, the absorbing units or "acoustic sinks," as I have called them, may be made up from suitably blanked sheets which can be folded to provide a box-like structure. However, units so constructed require a series of assembling and mounting operations at the point of use which are time consuming and relatively costly. To avoid these objections, it has been proposed to form the absorber units or sinks of a pair of complemental parts which may be nested together compactly for storage, but which can be assembled when the units are to be set up for use by placing the two halves of each unit together and securing them to each other by suitable means. The assembled units are then ready for installation on suitable members throughout a room, auditorium, or other enclosures requiring acoustic treatment.

While the latter arrangement overcomes, to a large extent, the objections to my original sink or absorber structure from the standpoints of storage and assembly, it still involves certain individual assembly and mounting operations which require considerable handling of the parts. To facilitate assembling and mounting of acoustic absorbers of the type described above it has further been proposed to form each half of the absorber unit with an outwardly extending peripheral flange at the base thereof, and stringing the two halves of each absorber unit, base facing base, on a wire or rod which can then be mounted on suitable anchoring members. The cooperating halves of each absorber unit may then be moved to any desired location on the supporting wire, the flanges of the two halves brought into contacting relation whereby to enclose the cavity of the unit, and the unit then locked in place on the supporting wire.

In some cases, as where the wires on which the acoustic absorbers or sinks are strung must be intertwined with pipes, beams, cables, lights, belting, etc., it is quite difficult to install the absorber units on the supporting wire in accordance with the above mentioned proposal after the wire has been mounted in place and has been stretched to a suitable degree. Moreover, it has been found that, in most cases, it is generally necessary to employ two or more persons to make an installation of the type mentioned above if there are obstructions to be overcome. This, of course, adds greatly to the cost of the installation.

The primary objects of my present invention, therefore, are not only to provide an improved form of acoustic absorber of the type mentioned above, but also to provide an absorber of this type the mounting of which will be greatly facilitated.

More particularly, it is an object of my present invention to provide an improved, diffraction type, acoustic absorber which can be mounted easily on a supporting wire or the like by only one person even where many obstructions are encountered.

Another object of my present invention is to provide an improved, diffraction type, acoustic absorber as set forth above which can be mounted readily on walls, ceiling, or the like without the aid of any supporting wires or rods.

A further object of my present invention is to provide an improved, diffraction type, acoustic absorber as aforesaid which will retain all the advantages of the compact, nesting feature for storage and shipment in accordance with the proposal of Owens.

Still another object of my present invention is to provide an improved mounting for acoustic absorbers of the diffraction type, which mounting will retain the absorber units against turning or swinging when they are mounted on wire or similar supports throughout the room.

It is also an object of my present invention to provide an improved, diffraction type, acoustic sink as above set forth which is very simple in construction, which can be readily installed even by one not skilled in the art, and which is highly efficient in use.

In accordance with my present invention, I make each acoustic absorber or acoustic sink unit of two complemental, hollow casing parts, each open only at one end, with the open end portion of one part arranged to fit snugly into the open end portion of the other in slightly overlapping relation to thereby enclose the cavity or space required in diffraction type absorbers. Each of the casing parts is provided with a pair of diametrically opposed, aligned slots extending away from the open end, the slots being arranged to overlap each other when the two halves are assembled and being of such length as to provide diametrically opposed openings for the reception of the supporting wire or the like. Thus, the wire may first be strung in place and suitably tensioned, after which each casing half of any absorber unit can be separately mounted on the wire and the open end of one fitted into the open end of the other to provide the complete absorber unit. The two halves may be held in assembled relation by any suitable means, such as spear head tacks or the like which can be pushed through the overlapping end portions. Acoustic absorbers of this construction can be installed readily by a single individual and on any selected portion of the strung wire between obstructions. If it is desired to make the mounting of the acoustic absorber units of my present invention more or less rigid so as to prevent the units from swinging or turning, additional slots may be provided thereon to slip over cross wires which may be relatively light in gauge.

The novel features that I consider characteristic of my present invention are set forth with particularity in the appended claims. The invention itself, however, both as to its organization and method of operation, as well as additional objects and advantages thereof, will best be understood from the following description of one embodiment thereof, when read in connection with the accompanying drawing in which:

Figure 1 is a side elevation of an acoustic absorber or sink constructed in accordance with my present invention, Figure 2 is an end elevation thereof as seen from the right of Figure 1, Figure 3 is a central, sectional view thereof taken on line III—III of Figure 1, Figure 4 is a sectional view taken on the line IV—IV of Figure 1, Figure 5 is a view, in perspective, showing several acoustic absorber units of my present invention mounted on a supporting wire and, Figure 6 is a view showing an absorber unit according to my present invention mounted on a ceiling.

Referring more particularly to the drawing, in which similar reference characters designate corresponding parts throughout, there is shown, in Figures 1 to 4, an acoustic absorber 1 constituted by two, hollow, somewhat bowl-shaped casing halves 1a and 1b. Each casing half is open only at one end where they terminate, respectively, in end flange portions 3a and 3b. The flange portion 3a is formed with a pair of diametrically opposed, aligned slots 5 which extend rearwardly from the open end of the casing half 1a. Similarly, the flange 3b is formed with a pair of diametrically opposed, aligned slots 7 which extend rearwardly from the edge of the flange 3b. The flange 3b is of somewhat smaller diameter than the flange 3a and is adapted to fit snugly into the latter, the openings 5 and 7 being so related that, when the casing halves 1a and 1b are thus assembled, they provide a pair of aligned openings or passages 9 for the reception of a mounting wire or rod 11.

The casing halves 1a and 1b are preferably both made of a material which is pervious to sound waves but which has a plurality of fine slits or passages therein which afford a high dissipative impedance to the passage of sound waves therethrough. An example of one suitable material is a felted material made from wood pulp fibers and sulphite, the fibers being accreted by suction from a pulp solution in well-known manner. When the two casing halves 1a and 1b are assembled together on the wire 11, they enclose a relatively large space or cavity 13 filled with air or other suitable fluid. The air space 13 is of sufficiently large volume to have a relatively large capacitance and therefore it will afford very little impedance to the passage of acoustical waves through the fine passages in the material of the casing halves 1a and 1b.

To mount absorber units of the type described above, it is merely necessary to first mount the supporting wire 11 in place, and each casing half 1a and 1b can then be slipped over the wire 11, the latter being received in the slots 5 and 7. When the flange 3b is fitted into the flange 3a, the wire 11 becomes locked between the two casing halves. To lock the two casing halves to each other, two or more spear head tacks 15 or the like may be formed through the flanges 3a and 3b at suitable points thereon, and the installation is complete. If it is found necessary or desirable to prevent the absorber units 1 from turning on the supporting wire 11 or to prevent the wire 11 from swinging, either additional horizontal cross wires 17, or vertical cross wires 19 may also be provided. The cross wires 17 may be threaded through aligned openings in the closed ends of the absorber unit halves, while the vertical cross wire 19 may be accommodate in slots similar to the slots 5 and 7.

In some cases, it may be desirable to mount the acoustic absorbers directly on walls or ceilings rather than on supporting wires. It is for this reason, largely, that I make the casing halves somewhat bowl-shaped to provide substantially flat, closed end portions 1c and 1d. By applying a suitable adhesive 21 to the flat surface 1c and placing it against a ceiling or wall 23, the casing half 1a can be made to adhere thereto. The casing half 1b may then be fitted into the applied casing half 1a by fitting the flange 3b into the flange 3a, and the two casing halves may then be secured to each other either by means of a suitable adhesive interposed between the flanges 3a and 3b, or by means of the tacks 15 or the like. Where the absorbers are mounted directly on the ceiling or wall, the slots 5 and 7 may be omitted.

From the foregoing description, it will be apparent to those skilled in the art that I have provided an improved and simple form of diffraction type acoustic absorber which has all the advantages of the acoustic absorber disclosed in my above identified copending application, which has the advantage that its casing halves can be nested within each other for compact storage, as proposed by Owens in his above identified copending application, and which has the further advantage of being free from the mounting difficulties encountered in the mounting arrangement proposed by Beers in his above identified copending application. Moreover, it will be apparent to those skilled in the art that an acoustic absorber constructed in accordance with my present invention can be mounted readily on ceilings, walls, partitions, and the like without requiring the stringing of mounting wires or other similar supports therefor.

Although I have shown and described but one form of my present invention, it will undoubtedly be apparent to those skilled in the art that many other modifications thereof, as well as changes in the particular one described, are possible within the spirit of my present invention. I therefore desire that this invention shall not be limited except insofar as is made necessary by the prior art and by the spirit of the appended claims.

I claim as my invention:

1. A diffraction type acoustic absorber comprising a pair of complemental, hollow parts of sound dissipative material cooperatively associated to enclose a cavity, said parts including overlapping rim portions, and said rim portions being provided with aligned passages for the reception of a mounting member.

2. A diffraction type acoustic absorber comprising a pair of complemental, hollow casing members of sound dissipative material each open at one end, the open end of one of said members being adapted to be fitted into the open end of the other of said members whereby said ends will be arranged in overlapping relation, said members enclosing a cavity when thus assembled, said ends being provided with aligned passages for the reception of a mounting member, and means for maintaining said casing members in assembled relation.

3. A diffraction type acoustic absorber comprising a pair of complemental, hollow, casing members of sound dissipative material each open at one end, the open end of one of said members being adapted to be fitted into the open end of the other of said members whereby said ends will be arranged in overlapping relation, said members enclosing a cavity when thus assembled, said ends being each provided with diametrically opposed passages so located as to be in aligned relation when said members are assembled to enclose said cavity, said passages being adapted to receive a mounting member therein, and means for maintaining said members in assembled relation.

4. A diffraction type acoustic absorber according to claim 3 characterized in that said passages are constituted by reversely directed slots in each of said members extending away from said open ends, said slots being arranged to overlap and provide aligned openings for the reception of said mounting member.

5. A diffraction type acoustic absorber comprising a pair of complemental, hollow casing members of sound dissipative material each open at one end, the open end of one of said members fitting into the open end of the other of said members in overlapping relation therewith, said members enclosing a cavity when thus assembled, said overlapping ends being provided with diametrically opposed passages for the reception of a mounting member, and means extending through said overlapping ends maintaining said casing members in assembled relation.

6. A diffraction type acoustic absorber according to claim 2 characterized in that said casing members are substantially bowl-shaped, and characterized further in that said casing members are adapted to be nested one within the other in compact relation for storage.

HARRY F. OLSON.

REFERENCES CITED

The following references are of record in the file of this patent:

UNITED STATES PATENTS

| Number | Name | Date |
|---|---|---|
| 271,749 | Stewart | Feb. 6, 1883 |
| 803,966 | Barnes | Nov. 7, 1905 |
| 1,119,165 | Hummel | Dec. 1, 1914 |
| 1,808,354 | King | June 2, 1931 |
| 2,390,262 | Mazer | Dec. 4, 1945 |

FOREIGN PATENTS

| Number | Country | Date |
|---|---|---|
| 102,914 | Australia | Jan. 6, 1938 |